Figure 1:
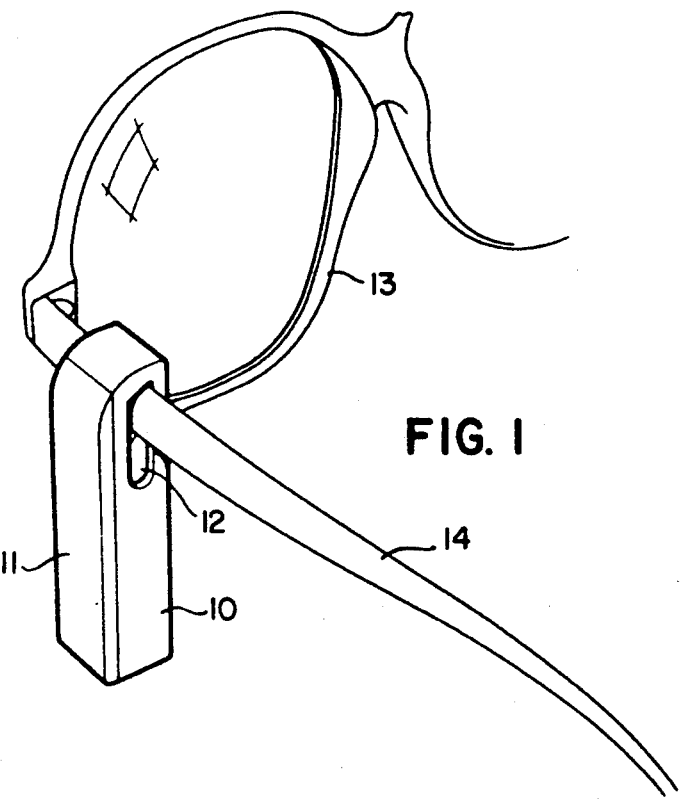

United States Patent [19]

Holmgren

[11] Patent Number: 5,144,820
[45] Date of Patent: Sep. 8, 1992

[54] ANTI-THEFT DEVICE FOR SPECTACLE FRAMES

[75] Inventor: Bertil Holmgren, Vellinge, Sweden

[73] Assignee: M W Trading APS, Glyngore, Denmark

[21] Appl. No.: 655,404

[22] PCT Filed: May 19, 1989

[86] PCT No.: PCT/SE89/00280
§ 371 Date: Feb. 18, 1991
§ 102(e) Date: Feb. 18, 1991

[87] PCT Pub. No.: WO90/14649
PCT Pub. Date: Nov. 29, 1990

[51] Int. Cl.$^5$ .............................................. G02C 11/00
[52] U.S. Cl. ..................... 70/57.1; 351/111; 70/34
[58] Field of Search ............... 70/57.1, 58, 32–34; 292/251, 327; 351/158, 111

[56] References Cited

U.S. PATENT DOCUMENTS 4,438,642  3/1984  De Jong .......................... 70/232
4,991,413  2/1991  Arnaldo ......................... 351/158

FOREIGN PATENT DOCUMENTS 2445538   8/1980  France ........................... 351/111
2590688  11/1985  France ........................... 351/111
2037390  12/1979  United Kingdom .

Primary Examiner—Renee S. Luebke
Assistant Examiner—D. Boucher
Attorney, Agent, or Firm—Merchant & Gould Smith, Edell, Welter & Schmidt

[57] ABSTRACT

The invention relates to an anti-theft device for spectacle frames, which consists of an elongate body (10, 11) to be clamped to one bow of the spectacle frame, said body comprising a sleeve (10) open at one end thereof and having a transverse aperture (12) to receive therein the bow. Furthermore, said body is provided with a sensor (33) affecting an anti-theft system. A slide (15) displaceable longitudinally of the sleeve can be adjusted for engagement and disengagement of the bow by a screw (18) locked against axial displacement in the sleeve. The screw can be operated manually when the anti-theft device is to be mounted and demounted by a special tool only, which can be inserted into the sleeve through the open end thereof to engage an engagement element (22) of the screw located inside the sleeve.

7 Claims, 3 Drawing Sheets

U.S. Patent Sep. 8, 1992 Sheet 1 of 3 5,144,820

ANTI-THEFT DEVICE FOR SPECTACLE FRAMES

The invention relates to an anti-theft device for spectacle frames intended for use in opticians' shops to prevent scrupulous persons from walking away quite impudently with a spectacle frame without having paid the required price therefor.

More particularly the anti-theft device of the invention is of the type comprising a body to be clamped to one bow of the spectacle frame, wherein clamping means can be operated manually by means of a special tool only when the body is to be mounted and demounted, said body being provided with a sensor affecting an anti-theft system.

Anti-theft devices of this kind are previously known, and one embodiment thereof is shown and described in FR-A-2,445,538. In this embodiment the body clamped to the bow provides a purely mechanical locking of the bow so that it will be held in the position of use thereof and cannot be folded against the rest of the spectacle frame as is done when spectacles are inserted into a cover, a bag or a pocket. Such an anti-theft device of the purely mechanical type is relatively bulky and prevents the spectacle frame from being tried on. Therefore, it is necessary at each try to remove initially the anti-theft device in order that the customer can try the spectacle frame on in a proper manner.

The purpose of the invention is to provide an anti-theft device of the kind referred to above which cannot be removed by the customer and can be retained on the bow when the spectacle frame protected against theft is being tried on, and additionally can be easily handled by the shop attendants. For this purpose the anti-theft device of the invention has obtained the characteristics as described in the claims.

Figure 2:
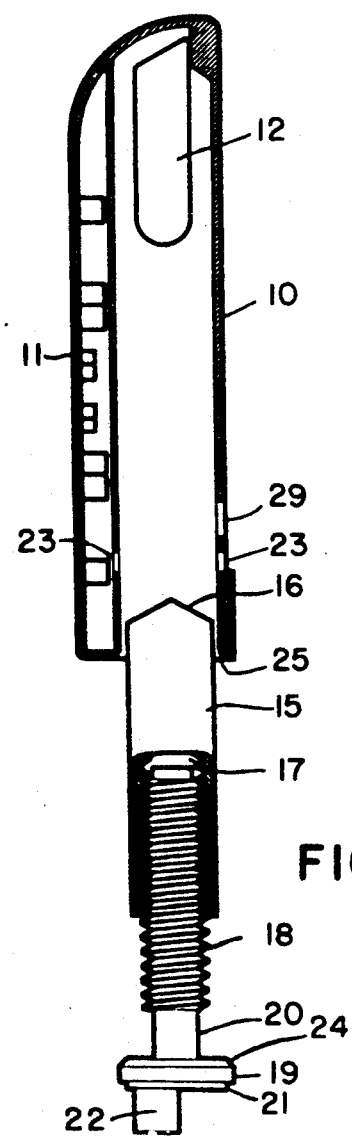
Figure 3:
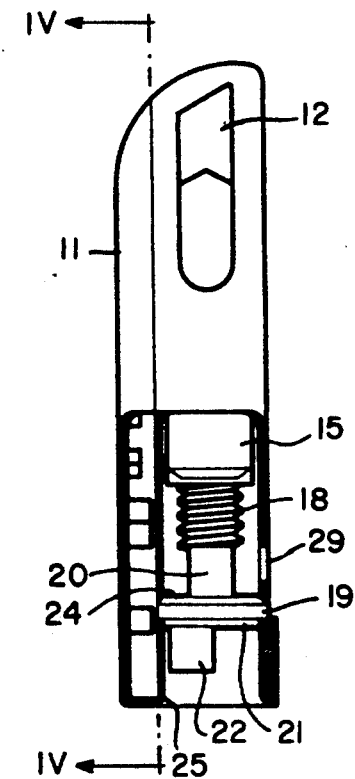
Figure 4:
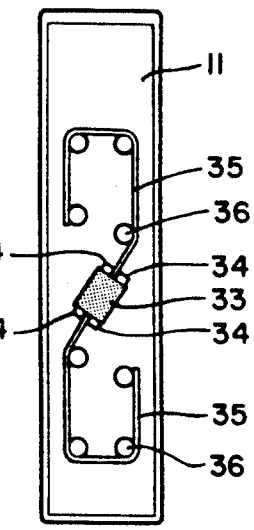
Figure 5:
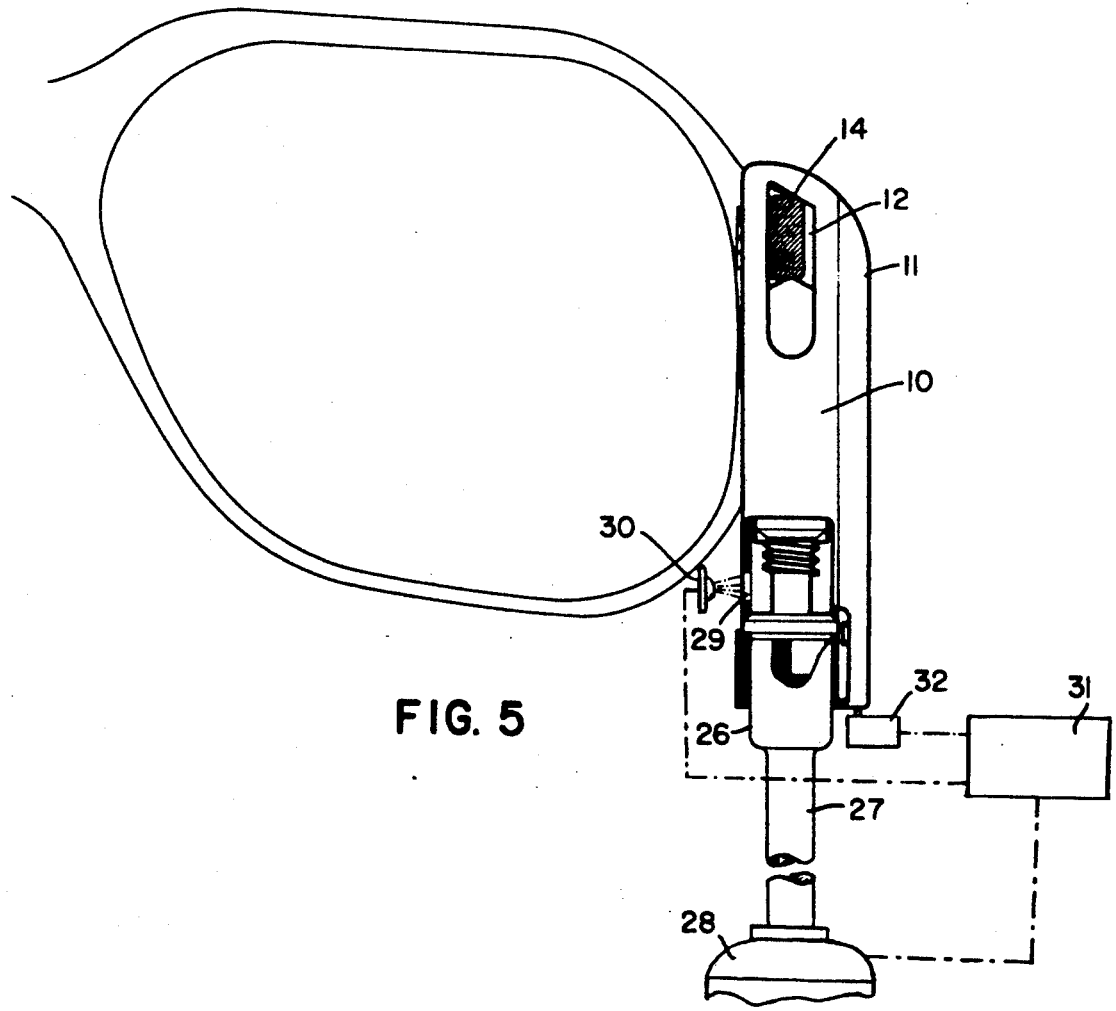
Figure 6:
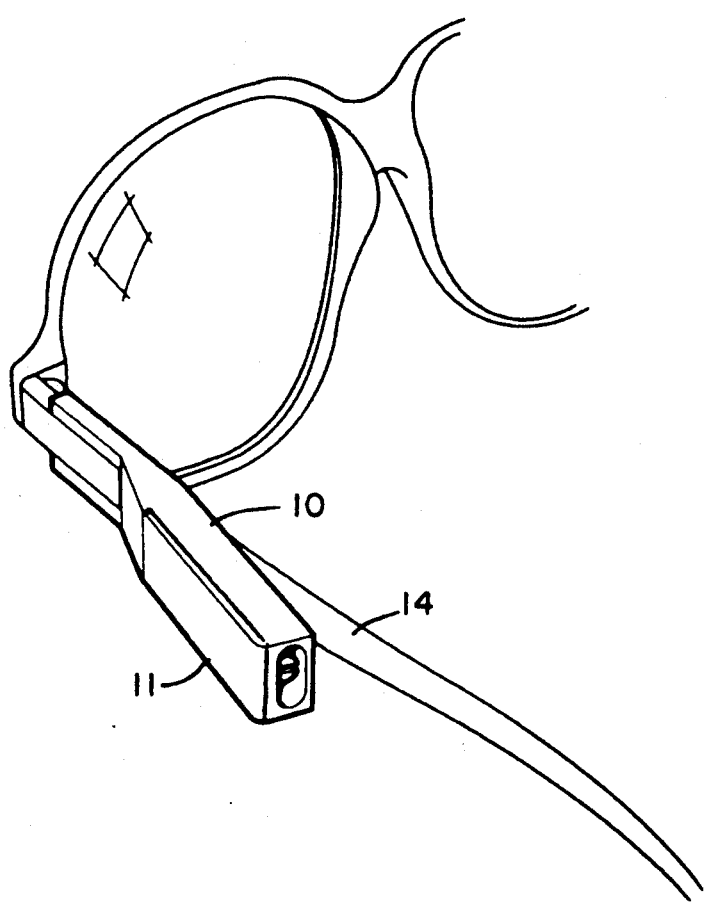

In order to explain the invention in more detail two embodiments thereof will be described below reference being made to the accompanying drawings in which FIG. 1 is a fragmentary perspective view of a spectacle frame provided with the anti-theft device according to the invention in one embodiment thereof, FIG. 2 is a exploded longitudinal cross-sectional view of the anti-theft device, FIG. 3 is a longitudinal cross-sectional view of the anti-theft device in the mounted condition, FIG. 4 is a view of a cover attached to the anti-theft device, as seen along line IV–IV in FIG. 3, FIG. 5 is a vertical cross-sectional view of the anti-theft device illustrating the mounting and demounting, respectively, thereof, and FIG. 6 is a perspective view, corresponding to FIG. 1, disclosing a second embodiment of the anti-theft device of the invention.

The anti-theft device in FIGS. 1 to 5 comprises a body formed as a sleeve 10 open at one end thereof, which has rectangular cross-sectional shape and preferably is made of plastics, for example poly carbonate. On one broad side thereof the sleeve is provided with a cover 11 of the same material as the sleeve, said cover being attached to the sleeve by ultrasound welding. The sleeve 10 has opposing longitudinal slots 12 in the two narrow sides thereof, which are big enough to allow the bow 14 of a spectacle frame 13 to be passed through the slots. Inside the sleeve there is provided a slide 15 displaceable therein of the same material as the sleeve and the cover. At the inner end the slide is bevelled as a ridge at 16, and the slide has a threaded blind hole 17 opening at the other end of the slide. A screw 18 preferably also consisting of plastics, for example an acetal resin, such as POM, engages the blind hole and has a head 19 formed as a circular disc, a smooth neck 20 being provided between the head and the thread of the screw. This smooth portion is provided in order that the screw thread will not be too long considering the fact that the shrinking of poly carbonate and POM are different (0.5 and 2.5%, respectively). Considering existing tolerances this could have the consequence that a screw which is too long will jam in the threaded hole. The head forms a shoulder 21 slightly spaced from the edge of the head, and an excentrically located non-circular pin 22 projects from the head inwardly of the shoulder.

The screw 18 is mounted in the sleeve 10 to be axially immovable by the head 19 having a diameter which is slightly larger than the distance between the broad sides of the sleeve 10, and being pushed into the sleeve under elastic yielding of the broad sides of the sleeve to snap into apertures 23 in the broad sides. In order that the head can be easily pushed into the sleeve the head is smoothly curved or bevelled at 24 and a bevelled surface is provided also at the opening of the sleeve at 25. When the slide with the associated screw is located in the sleeve the shoulder 21 will engage the inner surface of the broad sides of the sleeve, and because the pin 22 is located inwardly of the shoulder, there is always a free space around the pin.

With the slide 15 in a retracted position, FIG. 2, the bow 14 can be passed through the slots 12, the slide 15 then being engaged with the bow and being pressed thereonto in order to lock the body 19, 11 to the bow. In order to rotate the screw 18 it is necessary, however, to use a special tool for engagement with the pin 22 on the head 19. This special tool according to FIG. 5 comprises a socket 26 on a spindle 27 which can be rotated optionally in one direction or the other by means of a motor 29. The socket 26 can be inserted into the sleeve 10 to be engaged with the head 19 located inside the sleeve, and has such shape internally that it will be positively engaged with the pin 22 when engaged with the head in order that the screw 18 when the spindle 27 is rotated by means of the motor 28 can be screwed in one direction or the other to press the slide 15 against the bow 14 when the body 10, 11 is being mounted to the bow, and for retraction of the slide from the bow when the body is being demounted from the bow.

In the sleeve there is provided in one broad side which forms the aperture 23 a further aperture 29 which is uncovered when the slide 15 is engaged with the bow, and is covered by the slide when the slide is in a retracted position. A photocell 30 can be mounted to sense through the aperture 29 if the slide is in one position or the other, and can determine the rotational direction of the spindle. The motor can be started by the sleeve 10 operating a microswitch 32 when the socket 26 is engaged with the head 19.

Since the head 19 having the pin 22 is located inside the sleeve 10 it cannot be reached with pliers or the like for manipulation of the screw 18. Accordingly, it is impossible to manipulate the screw otherwise than by using the special tool with the socket 26 and, therefore, the body 10, 11 is securely attached to the bow 14, said body extending transversely of the bow and being directed downwards as seen in FIG. 1.

Inside the body there is located a sensor 33 (a so-called "diode") of the type affecting a magnetic, acoustic or electromagnetic field maintained between bowshaped antennas at the exit of a shop to disturb the field and cause signal generation. Said sensor is mounted inside the cover 11, and for this purpose the cover has on the inner side thereof four small pins 34 between which the sensor 33 is located while antennas 35 of flexible wire provided on the sensor are passed around other, large pins 36 on the inside of the cover. When the cover 11 is attached to the sleeve 10 the pins are positioned adjacent the outside surface of the sleeve such that the sensor is held in a well defined position. The sensor 33 may be replaced by a magnetic tape or the like which is attached to the outside surface of the sleeve 10 inside the cover 11.

The embodiment of the anti-theft device according to the invention, which is shown in FIG. 6, is intended to be mounted in a position wherein it is directed obliquely outwards and backwards from the bow.

However, the embodiment of FIGS. 1 to 5 at present is the preferred embodiment because this embodiment of the anti-theft device is of a simpler construction than that disclosed in FIG. 6.

As will be seen from the drawings the anti-theft device of the invention in both embodiments thereof which have been disclosed herein is out of the way when the spectacle frame is to be tried on and does not prevent the bow from being folded against the rest of the spectacle bow.

I claim:

1. An anti-theft device for spectacle frames having spaced apart bows which, when unfolded, define a space therebetween, said device comprising:
   a) a body having an elongated sleeve open at one end thereof, said sleeve having a transverse aperture therethrough to receive the bow, said aperture being bounded by two sidewalls and an end wall formed at an angle oblique to one of the side walls,
   b) means for clamping the sleeve to the bow including a slide displaceable longitudinally within said sleeve and a screw received within the slide, said sleeve leaving the defined space free of obstruction, so that the frame may be worn without removal of the device and so that a bow extending through said aperture will tend to be biased against at least two inner walls of said aperture when said slide engages the bow.

2. Anti-theft device according to claim 1 wherein the aperture extends substantially perpendicularly to the longitudinal direction of the body.

3. Anti-theft device as in claim 1 wherein the screw is locked against axial displacement in the sleeve by a circular head on the screw engaging an aperture in a sidewall of the sleeve.

4. Anti-theft device according to claim 3 wherein said screw is recessed within said sleeve, the head of said screw having a projecting pin for use with a tool for engaging said pin.

5. Anti-theft device as in claim 4 wherein the pin is located eccentrically on the head inwardly of an edge thereof.

6. Anti-theft device as in claim 1 wherein a sensor is located under a cover attached to the sleeve.

7. A device according to claim 1 wherein said slide includes a bevelled contact surface at the end which is intended to contact the bow.

* * * * *